US012670918B2

(12) United States Patent
Lubin et al.

(10) Patent No.: US 12,670,918 B2
(45) Date of Patent: Jun. 30, 2026

(54) VOICE MODIFICATION

(71) Applicant: SRI International, Menlo Park, CA (US)

(72) Inventors: Jeffrey Lubin, Plainsboro, NJ (US); Clay Spence, Santa Rosa, CA (US)

(73) Assignee: SRI International, Menlo Park, CA (US)

( * ) Notice: Subject to any disclaimer, the term of this patent is extended or adjusted under 35 U.S.C. 154(b) by 77 days.

(21) Appl. No.: 18/576,127

(22) PCT Filed: Jul. 14, 2022

(86) PCT No.: PCT/US2022/073721
§ 371 (c)(1),
(2) Date: Jan. 3, 2024

(87) PCT Pub. No.: WO2023/288265
PCT Pub. Date: Jan. 19, 2023

(65) Prior Publication Data
US 2024/0355346 A1 Oct. 24, 2024

Related U.S. Application Data

(60) Provisional application No. 63/222,226, filed on Jul. 15, 2021.

(51) Int. Cl.
G10L 17/02 (2013.01)
G10L 17/04 (2013.01)
(Continued)

(52) U.S. Cl.
CPC ............ G10L 21/013 (2013.01); G10L 17/02 (2013.01); G10L 17/04 (2013.01); G10L 17/26 (2013.01); *G10L 2021/0135* (2013.01)

(58) Field of Classification Search
CPC ....... G10L 21/013; G10L 17/02; G10L 17/04; G10L 17/26; G10L 2021/0135; G10L 15/26; G10L 17/00; G10L 21/003
See application file for complete search history.

(56) References Cited

U.S. PATENT DOCUMENTS 9,530,103 B2 * 12/2016 Fastow ................... G10L 15/32
11,935,517 B2 * 3/2024 Huang .................. G10L 15/183
(Continued)

FOREIGN PATENT DOCUMENTS

WO WO-2021118543 A1 * 6/2021 ............. G06N 3/044

OTHER PUBLICATIONS

H.-T. Luong and J. Yamagishi, "Nautilus: A Versatile Voice Cloning System," in IEEE/ACM Transactions on Audio, Speech, and Language Processing, vol. 28, pp. 2967-2981, 2020, doi: 10.1109/TASLP.2020.3034994. (Year: 2020).*
(Continued)

*Primary Examiner* — Paras D Shah
*Assistant Examiner* — Mulugeta Tuji Dugda
(74) *Attorney, Agent, or Firm* — Shumaker & Sieffert, P.A.

(57) ABSTRACT

A computing system that receives an audio waveform representing speech from an individual and produces as output a modified version of the audio waveform that maintains the speaker's speech characteristics as well as prosody for specific utterances (e.g., voice timbre, intonation, timing, intensity). The system uses a bottleneck-based autoencoder with speech spectrograms as input and output. To produce the output audio waveform, the system includes a reconstruction error-based loss function with two additional loss functions. The second loss function is speaker "real vs fake" discriminator that penalizes for the output not sounding like the speaker. The third loss function is a speech intelligibility
(Continued)

scorer that penalizes the output for speech that is difficult for the target population to understand. The produced modified audio waveform is an enhanced speech output that delivers speech m a target accent without sacrificing the personality of the speaker.

20 Claims, 7 Drawing Sheets

(51) Int. Cl.
 *G10L 17/26* (2013.01)
 *G10L 21/013* (2013.01)

(56) References Cited

U.S. PATENT DOCUMENTS

| | | | | |
|---|---|---|---|---|
| 2017/0371959 | A1* | 12/2017 | Osotio | G06F 16/683 |
| 2019/0251952 | A1* | 8/2019 | Arik | G10L 13/08 |
| 2020/0380952 | A1* | 12/2020 | Zhang | G10L 13/08 |
| 2021/0151029 | A1* | 5/2021 | Gururani | G06N 3/0455 |
| 2021/0304786 | A1* | 9/2021 | Fujii | G06N 20/00 |
| 2022/0358703 | A1* | 11/2022 | Chae | G06N 3/09 |
| 2023/0005468 | A1* | 1/2023 | Nagano | G10L 13/10 |

OTHER PUBLICATIONS

Wang, Zhichao, Wenshuo Ge, Xiong Wang, Shan Yang, Wendong Gan, Haitao Chen, Hai Li, Lei Xie, and Xiulin Li. "Accent and speaker disentanglement in many-to-many voice conversion." In 2021 12th International Symposium on Chinese Spoken Language Processing (ISCSLP), pp. 1-5. IEEE, 2021. (Year: 2021).*

Wang, Zhichao, Xinyong Zhou, Fengyu Yang, Tao Li, Hongqiang Du, Lei Xie, Wendong Gan, Haitao Chen, and Hai Li. "Enriching source style transfer in recognition-synthesis based non-parallel voice conversion." arXiv preprint arXiv:2106.08741 (2021). (Year: 2021).*

International Preliminary Report on Patentability from International Application No. PCT/US2022/073721 dated Jan. 25, 2024, 12 pp.

International Search Report and Written Opinion of International Application No. PCT/US2022/073721 dated Oct. 13, 2022, 12 pp.

* cited by examiner

JA to JA

JA to AM

Japanese

American

VOICE MODIFICATION

This application is a National Stage Entry of International Application No. PCT/US2022/073721, filed 14 Jul. 2022, which claims the benefit of U.S. Provisional Patent Application 63/222,226, filed 15 Jul. 2021, the entire content of each of which is incorporated herein by reference.

TECHNICAL FIELD

The disclosure relates to speech processing and, more particularly, to machine learning systems for speech processing.

BACKGROUND

Machine learning systems may use various techniques to receive input features and output modified representation of the input features. Autoencoders, for example, are an unsupervised learning technique, which use neural networks for representation learning. Autoencoders may receive input features in the form of images, video or audio waveforms, among other signals. For example, using voice recognition technology, computing systems can generate a transcript, which is a modified representation of the words uttered by a presenter or participants in a meeting. A machine learning system may process an audio recording or live stream of an event and produce a modified representation of the audio recording or live stream, such as a transcript or a modified live stream.

SUMMARY

In general, the disclosure describes techniques for voice accent modification. In an example, a computing system executes an application that implements a method based on an autoencoder with several competing discriminators. The computing system receives as input an audio waveform representing speech from an individual desiring to modify their accent (e.g., for a foreign speaker seeking better intelligibility by a local audience), and the computing system produces as output a modified version of the audio waveform that maintains all of the speaker's speech characteristics. Some example characteristics include derived features such as pitch, phonemes and emphasis as well as prosody for specific utterances (e.g., voice timbre, intonation, timing, pauses, and intensity). This output may be modifiable by the user to allow independent adjustment of and trade-offs between the amount of accent modification (e.g., reduction) and the identifiability of the speaker's voice in the resulting waveforms.

In one example, the disclosure describes a system comprising: an input device configured to receive an input audio waveform comprising utterances by a speaker; and a computation engine comprising processing circuitry for executing a machine learning system. The machine learning system is configured to implement an autoencoder, the autoencoder comprising a decoder trained to characterize a target accent such as for a target audience using (1) a speaker identification (ID) loss function that applies a penalty based on an identity for the speaker and (2) a text loss function that applies a penalty for loss of intelligibility. The machine learning system is also configured to process the input audio waveform to generate an output audio waveform comprising the utterances by the speaker that are modified by the trained decoder to conform to the accent for the target audience, and the machine learning system is configured to output the output audio waveform.

In another example, the disclosure describes a method comprising: processing, with an encoder of a machine learning system, an input audio waveform comprising first utterances by a speaker to generate an encoder output, the first utterances having a first accent, processing, with a decoder of the machine learning system, the encoder output to generate an output audio waveform comprising second utterances, the second utterances having a second accent different from the first accent, computing, with a signal loss discriminator of the machine learning system and based on the input audio waveform and the output audio waveform, a signal loss for the output audio waveform, computing, with an identification loss discriminator of the machine learning system, based on the input audio waveform and the output audio waveform, an identification loss for the output audio waveform, computing, with a text loss discriminator of the machine learning system, based on the input audio waveform and the output audio waveform, a text loss for the output audio waveform; and training the decoder using the signal loss, the identification loss, and the text loss.

DETAILED DESCRIPTION

Figure 1:
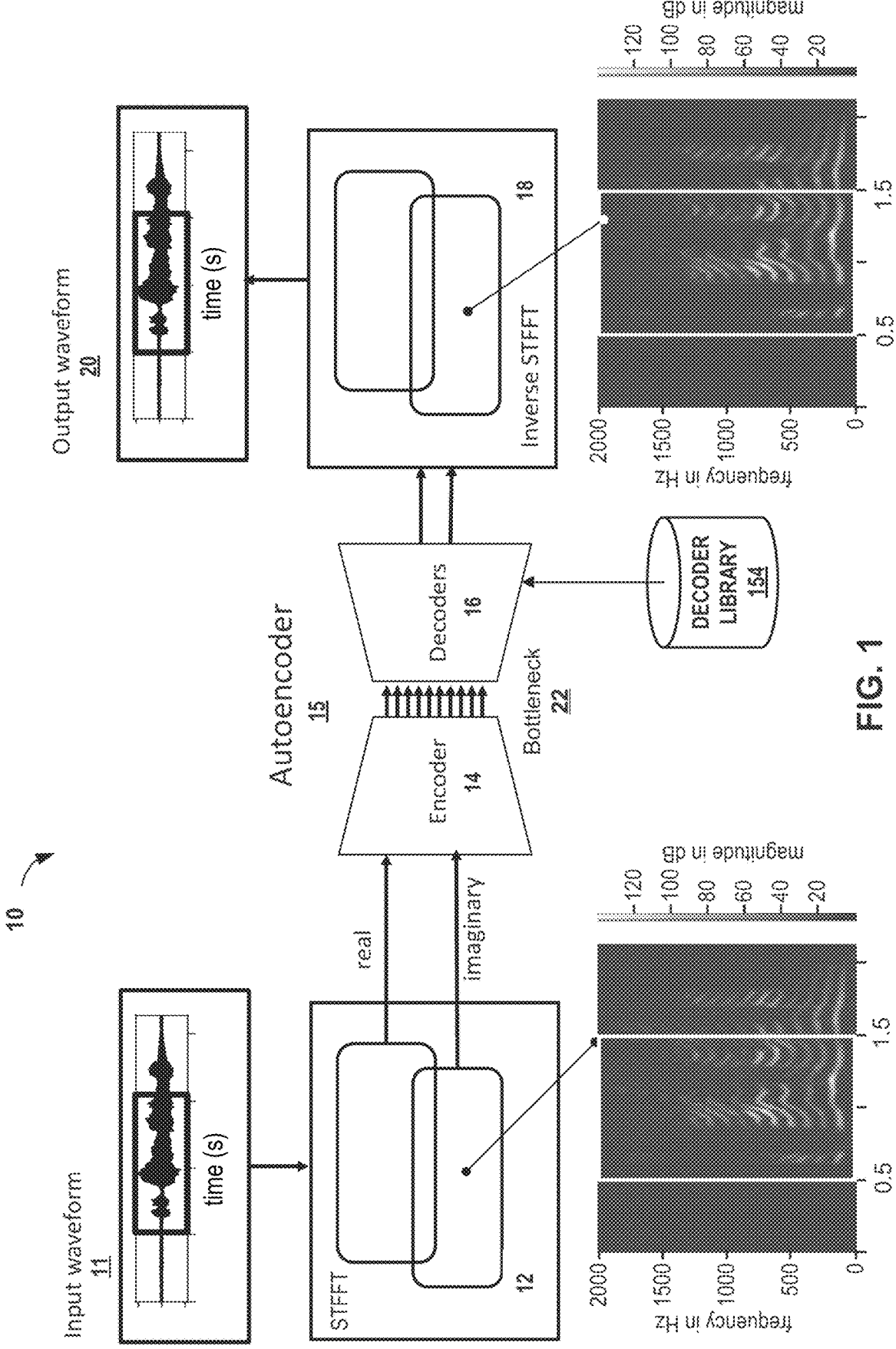
FIG. 1 is a block diagram illustrating a bottleneck-based autoencoder configured to output a modified audio waveform according to one or more techniques of this disclosure.

The disclosure describes techniques for voice accent modification. In an example, a computing system executes an application that implements a method based on an autoencoder with several competing discriminators. The computing system receives as input an audio waveform representing speech from an individual desiring to modify their accent (e.g., for a foreign speaker seeking better intelligibility by a local audience) and produces as output a modified version of the audio waveform that maintains all of the speaker's speech characteristics (timbre) as well as prosody for specific utterances (e.g., voice timbre, intonation, timing, intensity). This output may be modifiable by the user to allow independent adjustment of and trade-offs between the amount of accent modification (e.g., reduction) and the identifiability of the speaker's voice in the resulting waveforms.

In an example, the disclosure describes a system that receives as input an audio waveform representing speech from an individual and produces as output a modified version of the audio waveform that maintains all of the speaker's speech characteristics as well as prosody for specific utterances. The system uses a bottleneck-based autoencoder with speech spectrograms as input and output. In other words, the neural network architecture may include a bottleneck in the network which forces a compressed knowledge representation of the original input.

To produce the output audio waveform, the system includes a decoder trained using a reconstruction error-based loss function with two additional and adversarial loss functions. The second loss function is speaker "real vs fake" discriminator that penalizes for the output not sounding like the speaker. The third loss function is a speech intelligibility scorer that penalizes the output for speech that is difficult for the target population to understand. A decoder may be trained for a specific individual targeted to a specific population, while the encoder may be considered a universal encoder. A user may independently adjust the amount of accent modification (e.g., accent reduction) and the degree of individual identifiability of the speaker's voice in the resulting output waveforms.

In this disclosure, an "accent" may refer to an individual's distinctive or characteristic pronunciation, inflection, tone, or prosody. The individual's speech characteristics may be particular to that person and may be a result of the individual's native language, the region where the individual learned to speak one or more languages, the individual's anatomy, and other factors. In some examples, an accent may also refer to a way of speaking that is typical of a particular group of people and especially of the natives or residents of a region. For example, the Spanish spoken in Puerto Rico has differences from the Spanish spoken in Spain, Mexico and other regions. The Arabic spoken in Egypt may use different words for the same items and have different inflections than the Arabic spoken in Saudi Arabia. The Mandarin spoken in Beijing may sound different from the Mandarin spoken in other regions of China.

In other examples, an accent may result from learning a new language. An individual whose native language is United States English, for example, may speak German, Spanish, Yiddish and so on, with an identifiable United States English accent.

In other examples, an "accent" may also refer to other differences in speech, for example, slurred words caused by a stroke or other anatomical differences, e.g., a cleft palate, and so on. A person who was born deaf or hard of hearing may speak in a particular manner that, for the purposes of this disclosure, may also be referred to as an accent. A decoder of this disclosure may help convert a speech waveform to produce a modified audio waveform with an enhanced speech output that delivers speech in a target accent that may be more intelligible for the target audience, e.g., reduced slurring, or accented for the target audience, without sacrificing the personality of the speaker. For example, for a U.S. English speaker with a target audience in Ireland, the decoder may deliver speech that sounds more like Irish English, e.g., the target accent, yet retain the speaker's recognizable language characteristics.

The system of this disclosure may have several practical applications, including outputting an audio waveform with accent modification for a foreign speaker seeking better intelligibility by a local audience. In some examples, the bottleneck-based autoencoder may be similar to an autoencoder used to process images.

FIG. 1 is a block diagram illustrating a bottleneck-based autoencoder configured to output a modified version audio waveform according to one or more techniques of this disclosure. The example of system 10 in FIG. 1 may include an autoencoder 15 configured to receive an input audio waveform 11 from any speaking individual. In some examples, converter 12 may convert the waveform to provide spectrogram-like inputs to autoencoder 15. An example converter may include a fast Fourier transform, e.g., a short-time fast Fourier transform (STFFT), which is a tool that may be used in speech and other time-varying signal processing areas. The STFFT may be performed in real time, and therefore may be implemented using computationally efficient techniques. The STFFT returns a two-sided spectrum in complex form (real and imaginary parts). In some examples the output from decoder 16 may pass through an inverse converter 18, e.g., an inverse STFFT, to deliver the enhanced output waveform 20. In other examples, the converter may constitute a phoneme embedding computation, e.g., that has been trained as a preprocessor for use in automatic speech recognition systems.

As shown in the example of FIG. 1, autoencoder 15 of system 10 has the following components: encoder 14, decoder 16 with a bottleneck layer 22 between encoder 14 and decoder 16. An encoder 14 is the part of the neural network which takes in the input and produces a lower dimensional encoding. The bottleneck layer 22 may be the lower dimensional hidden layer where the encoding is produced. The bottleneck layer 22 may have a lower number of nodes than encoder 14 in the neural network. The number of nodes in the bottleneck layer 22 also gives the dimension of the encoding of the input. The decoder 16 takes in the encoding and recreates the input. The decoder may decode to a spectrogram or to some other intermediate representation first and then from there to an output waveform, or it may decode directly to the output waveform. The loss functions used in training the decoder may recreate the enhanced output waveform 20 based on the input waveform 11.

System 10 may also encode as well as decode the waveforms at a phoneme trigram level, to enable more accurate rendering of contextual differences in speech sounds. Phoneme recognition may use, for example, no-gram, bigram, and trigram phoneme language models, which are statistical language models. Statistical language models are the type of models that assign probabilities to the sequences of words. For example, in those models an N-gram is a sequence of N words. Therefore, a bigram is a two-word sequence of words while a trigram is a three-word sequence of words. By contrast here a phoneme trigram is a sequence of three phonemes.

The computing system of this disclosure may provide technical improvements to voice recognition and conversion processes that have several practical applications, including outputting an audio waveform with accent modification for a foreign speaker seeking better intelligibility by a local audience. Other example applications may include adding or removing slurred speech, changing a speaker's voice to hide (disguise) the speaker's identity, such as for witness protection or other purposes as well as other similar speech modification applications.

In this disclosure, a "meeting" may refer to spoken exchanges between two or more people and also spoken monologue, such as a speech or presentation, given by a single participant. The spoken exchange may include a set of utterances within the meeting that relate to e.g., an introduction, an agenda, an action item or task, an explanation, an overall summary, and other utterances.

In some examples, inputs to autoencoder 15 from input waveform 11 may include several derived features in the speech of the speaking individual, also referred to as the "speaker" in this disclosure. Some example derived features may include pitch, phonemes, energy, emphasis, pauses and similar derived features, such as measuring local temporal dynamics of these features, that may be identifiable characteristics of speech for a particular person. Autoencoder 15 may include analysis of such derived features in the enhanced output waveform 20, which allow listeners to recognize and identify the speaker by listening to versions of output waveform 20. In this manner, autoencoder 15 of this disclosure may provide advantages over other speech systems in reproducing identifiable speech, or hiding the identity of a speaker, based on input waveform 11.

Each decoder may be trained to be specific to a particular speaker and to a specific audience. For example, a speaker from India may hold a teleconference with an audience of one or more persons from a specific location, e.g., London England, Dublin Ireland or Cork Ireland. The decoder training library may include three separately trained decoders for the speaker from India configured to accurately convey the speaker's speech characteristics and prosody. Each respective decoder may be trained such that the enhanced output waveform includes characteristics, e.g., accent and speech utterances, that are understandable to an audience from Dublin, vs. an audience from London. In contrast to other speech conversion systems, the enhanced output waveform of this disclosure may also retain the recognizable individual language characteristics of the speaker.

The system of this disclosure may have advantages over other types of systems. For example, speech-to-text encoder and text-to-speech decoder, or similar processes, may be used in tandem to convert one speaker's voice to sound like another speaker's voice. However, all prosody information, e.g., the patterns of stress and intonation in a speaker's language, may be lost. The resulting speech can sound generic and without affect, even if the speech is a realistic and intelligible rendering in the speaker's preferred voice. Some other autoencoder-based methods for voice conversion, such as those involving variational autoencoders (VAEs), may be difficult to train, and to date not been demonstrated for accent reduction in the same voice, but only for conversion from one voice to another.

Figure 2:
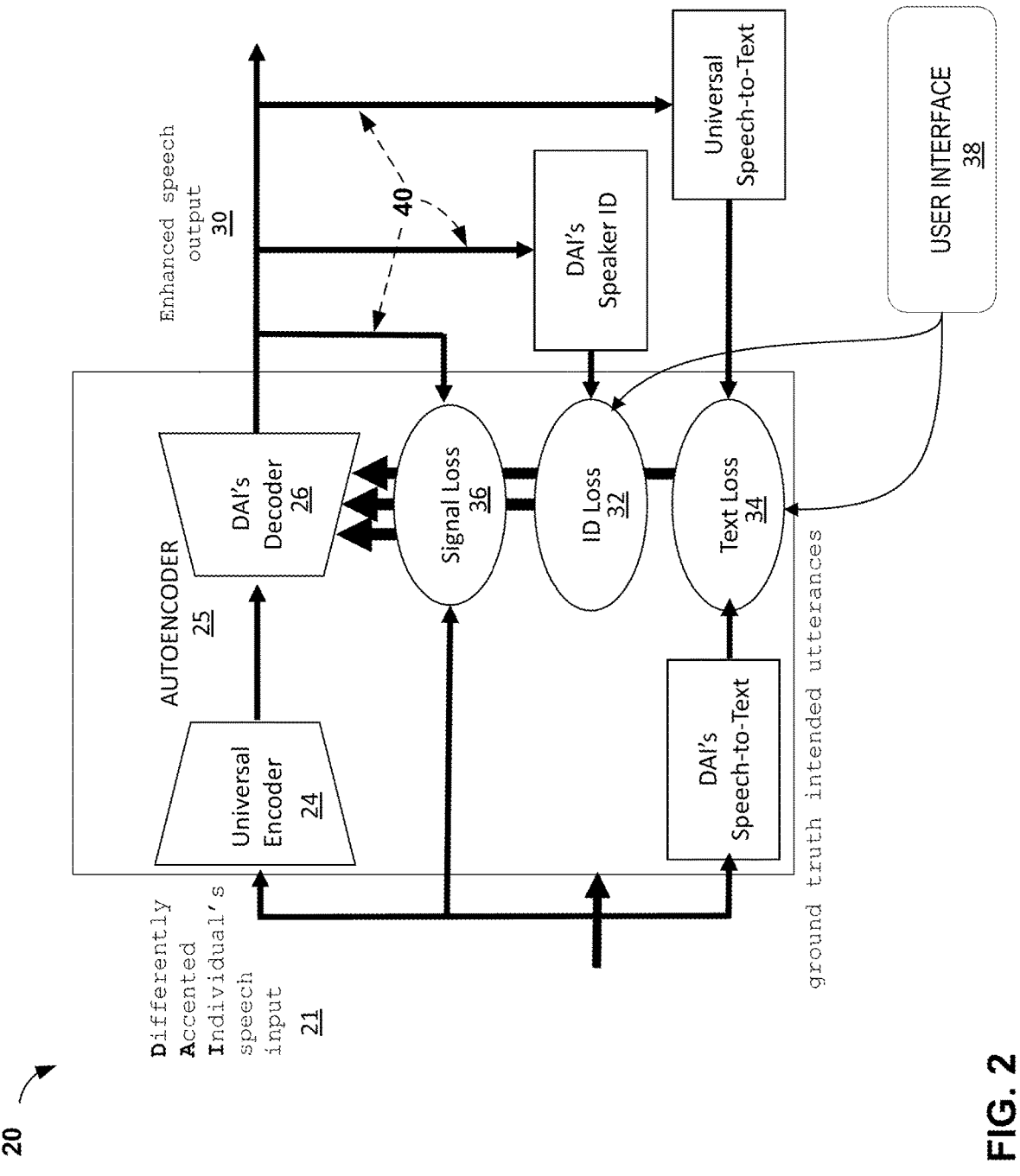
FIG. 2 is a block diagram illustrating an example speech intelligibility enhancement system according to one or more techniques of this disclosure.

FIG. 2 is a block diagram illustrating an example speech intelligibility enhancement system according to one or more techniques of this disclosure. System 20 is an example of system 10 described above in relation to FIG. 1. System 20 is configured to receive an input audio waveform from a differently accented individual's (DAI) speech input and output an enhanced speech output. As described above for FIG. 1, in some examples the enhanced speech output may reduce or otherwise change the accent and other characteristics of the DAI's speech input to an output in a target accent that may be more easily understood by a target audience. In other examples, system 20 may hide the identity of the speaker. System 20, as with system 10, may retain the individual speech patterns, e.g., prosody and intonation, and derived features of DAI, rather than a generic speech output. Though not shown in FIG. 2, system 20 may also include one or more converters, such as an STFFT, described in FIG. 1.

System 20 includes universal encoder based autoencoder 25 that uses a universal speech-to-text loss function. The decoder 26 of system 20 is configured to output enhanced speech audio waveform 30 by including both a speech intelligibility matcher loss function 36 with real vs fake output discriminator (DAI's speaker ID) 32 along with a text loss function 34 comparing universal to DAI's speech-to-text (STT), for text loss from ground truth of DAI's intended text. In other words, a speaker identification loss function may apply a penalty based on an identity for the speaker. As noted above, in some examples, the machine learning system may generate the output waveform to retain recognizable individual language characteristics of the speaker. In other examples, the machine learning system may generate the output waveform to disguise recognizable individual language characteristics of the speaker, e.g., the "target accent" may be to hide the identity of the speaker. To disguise the language characteristics, speaker ID loss function 32 may apply a penalty for correctly identifying the speaker. Similarly, the text loss function 34 may apply a penalty for loss of intelligibility.

In this manner the autoencoder 25 of system 20 may provide an enhanced speech output 30 with an accurate representation of the meaning of DAI's input utterances 21 as well as retaining the individual speech characteristics specific to the DAI. In other words, the enhanced speech output audio waveform 30 from system 20 in a target accent that may increase speaker's intelligibility to a target audience without sacrificing individuality of the speaker's voice. Each decoder 26 for system 20 may be a function trained based on a source DAI to a target audience.

During training of DAI's decoder, all three losses, including signal loss 36, feed into the decoder 26. The loss functions may be adversarial, in that the final enhanced speech output 30 may result from a trade-off between the three loss functions. In some ways, system 20 may be similar to a Generative Adversarial Network (GAN) and recognize patterns and relationships in the training examples to create a model for the decoder that can be used by the machine learning system to render the enhanced speech output, for example to generate audio waveforms from spectrograms. In further examples, the machine learning system may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train the decoders in the library of decoders. In some examples, any one or more of the loss functions may be fixed during training, or may be trained along with the autoencoder modules, e.g., in an adversarial fashion.

The signal loss function 36 compares the enhanced speech output to the DAI's speech input to ensure the decoder accurately decompresses the input audio waveform that passed through the bottleneck of the neural network of autoencoder 25. In other words, the signal loss function 36 is the feedback to ensure the enhanced speech output is as much like the DAI's speech input as possible. In system 20, the addition of the ID loss 32 and text loss 34 make the speech output into the enhanced speech output 30. In other words, the ID loss and text loss modify the output waveform 30 away from a perfect rendering of the input waveform 21 to add the accent modification and intelligibility modification for the target accent. Decoder 26, for the same speaker, e.g., the same DAI, may be trained differently for a different target accent and stored in decoder library 154 of FIG. 1. In other words, each speaker may have one or more decoders based on one or more target accents.

The text loss 34 compares the DAI's speech to text to the output of a universal speech to text that receives the enhanced speech output. The text loss comparison may penalize DAI's decoder for intelligibility. The text loss comparison may include a speech intelligibility scorer that penalizes the output for speech that is difficult for the target population to understand.

In some examples, system 20 may adjustably trade-off intelligibility vs how much the enhanced speech output sounds like real DAI, by differentially weighting text loss vs ID loss. In the example of FIG. 2, system 20 includes a user interface 38 that may control the weighting, e.g., of intelligibility versus identifiability. In some examples, the weighting controls may operate individually. In other examples the weighting controls may operate together, similar to a single bass-treble knob or slider on an audio amplifier.

In some examples, the process may include pre-training the DAI's text loss function 34 and DAI's speaker ID loss function 32, and using the fixed, pre-trained loss functions to train the decoder 26. In other examples, the loss functions of FIG. 2 may be trained along with the encoder and decoder as an adversarial network.

As shown in the example of system 20, the output signals are back propagated 40. In some examples the loss functions of system 20 may be gradient descent loss functions. A loss function may also be described as a cost function in this disclosure. Gradient descent is an iterative optimization algorithm in machine learning to minimize a loss function. Gradient descent process may update the parameters of the model. In some examples, parameters may refer to coefficients in weights, linear regression and so on in neural networks.

Once trained, system 20 may operate as a simple encoder/decoder with only a runtime module. Such an encoder/decoder may avoid the need for explicit modeling of complex vocal actions.

In some examples, system 20 may include baseline voice conversion, which may include conversion of one person's voice to realistic rendering of another person's voice. System 20 may also include accent conversion, which may convert speech from one accent into speech from another accent. The accent conversion training of system 20 may be based on a single individual with and without specific accent. In other examples, system 20 may be configured for full accent conversion. Full accent conversion may convert speech from one accent into speech from another, without requiring accented and unaccented speech from the same person. The full accent conversion may incorporate individual and group phoneme classifiers for accent modification. In other examples, system 20 may be configured to automatically detect the speaker's accent and pick an appropriate neural network. Automatically selecting the neural network may minimize training time for the decoder, and/or encoder. In some examples, system 20 may also be configured for online training refinement, intelligibility/identifiability adjustment, speed of operation, voice quality and so on.

Figure 3:
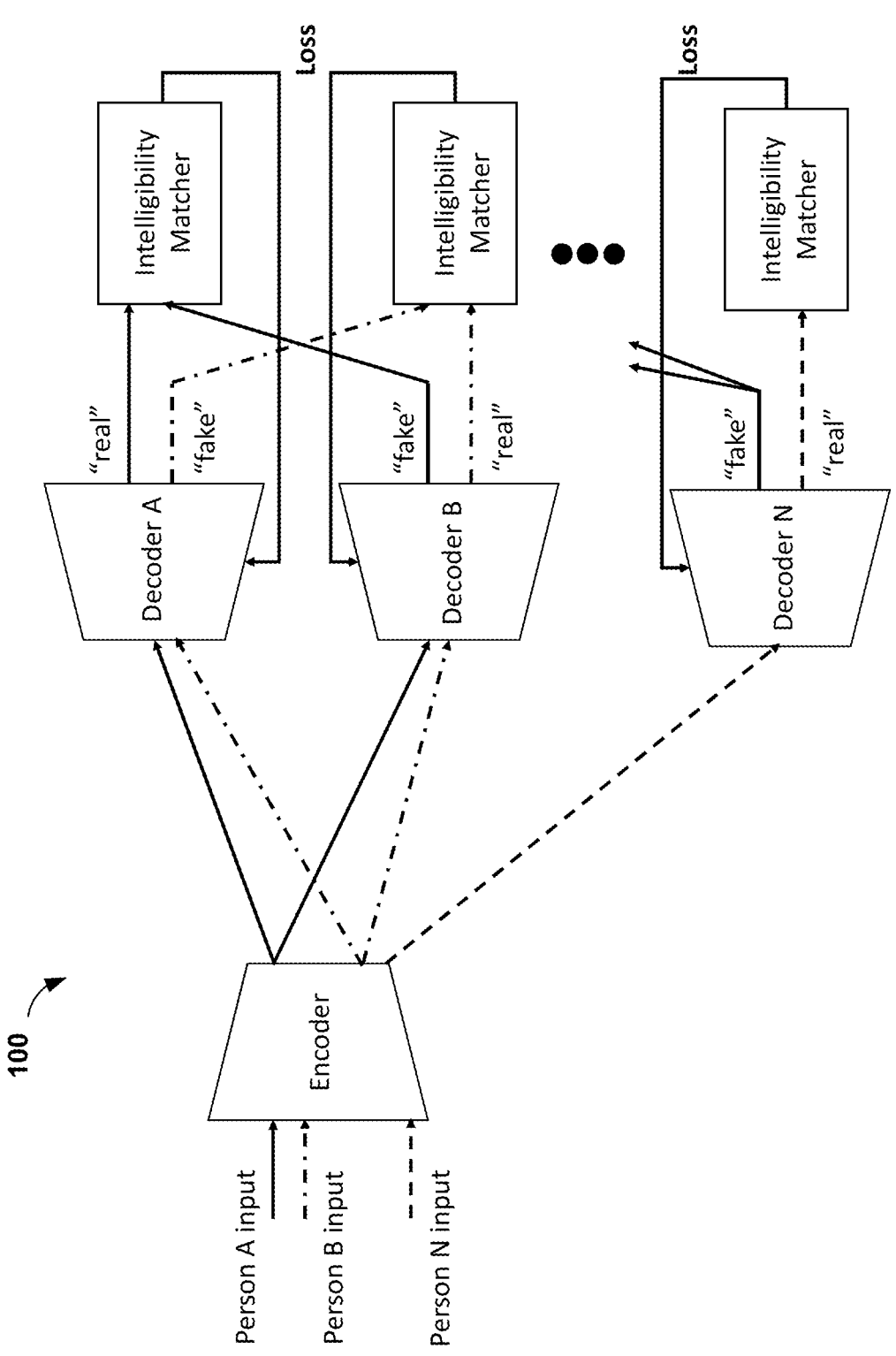
FIG. 3 is a conceptual block diagram illustrating an example operation of a speech intelligibility matching process according to one or more techniques of this disclosure.

FIG. 3 is a conceptual block diagram illustrating an example operation of a speech intelligibility matching process according to one or more techniques of this disclosure. System 100 in the example of FIG. 3 depicts an example of training the DAI speaker ID loss function described above in relation to FIG. 2. As described above, the encoder may be a multiple input encoder, e.g., an encoder configured to encode audio input from more than one speaker. The encoder may also be described as "multiple speaker encoder." Each decoder may be specific to a speaker as well as specific to the target accent. To train the decoder to be specific to the speaker, the training process may include a speaker "real" vs "fake" discriminator that penalizes for the output not sounding like the speaker. In this disclosure, "real" may refer to the speaker for the decoder, where "fake" may refer to a different speaker.

In the example of FIG. 3, the universal encoder may receive input audio waveforms from several speakers, e.g., speaker A, and speaker B through speaker N. During training, decoder A may receive the output for speaker A as well as for speaker B through speaker N (not shown in FIG. 3) from the encoder. An intelligibility matcher for decoder A may penalize crossed outputs for intelligibility differences between real (from speaker A) and fake (from speakers B through speaker N) in the loss feedback to decoder A. The intelligibility decoder for decoder B through speaker decoder N may operate in a similar manner as described for decoder A. In addition, in some examples, the intelligibility matcher may augment the decoder discriminator to provide extra sensitivity for speech over, for example, sensitivity for other sounds.

Figure 4:
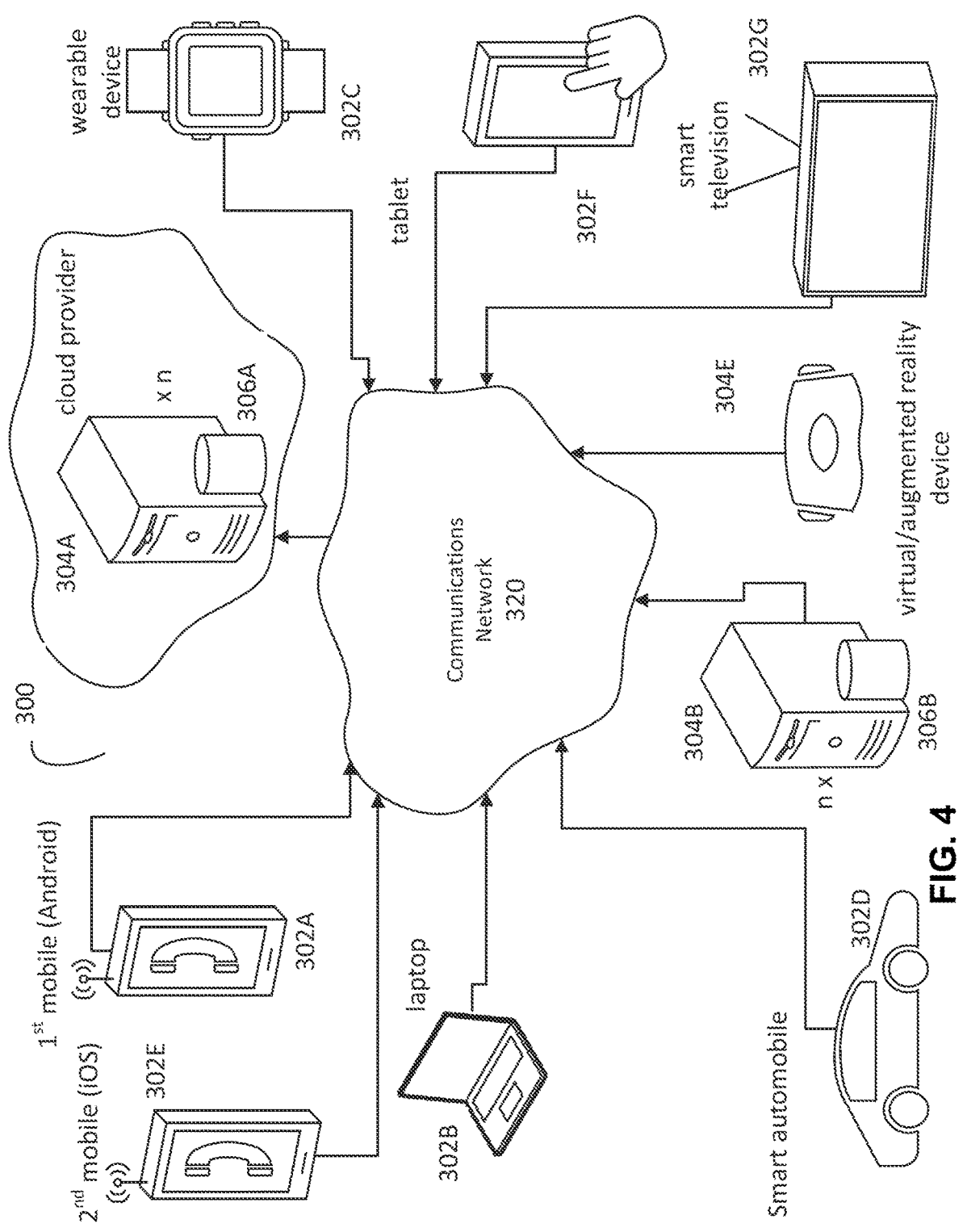
FIG. 4 is a block diagram of a number of electronic systems and devices communicating with each other in a network environment according to one or more techniques of this disclosure.

FIG. 4 is a block diagram of a number of electronic systems and devices communicating with each other in a network environment according to one or more techniques of this disclosure. Components of the voice modification system, e.g., systems 10, 20 and 100 described above in relation to FIGS. 1, 2 and 3 as well as the components of computing device 700 described in FIG. 5, may operate in a distributed network environment.

The network environment has a communications network 320 that connects server computing systems 304A through 304B, and at least one or more client computing systems 302A to 302G. As shown, there may be many server computing systems 304A through 304B and many client computing systems 302A to 302G connected to each other via the network 320. Examples of network 320 might be or include one or more of: an optical network, a cellular network, the Internet, a Local Area Network (LAN), Wide Area Network (WAN), satellite link, fiber network, cable network, or a combination of these and/or others. Each server computing system 304A-304B can have circuitry and software to communication with the other server computing systems 304A through 304B and the client computing systems 302A to 302G across network 320. Each server computing systems 304A to 304B can be associated with one or more databases 306A to 306B and may be configured to store information such as decoder library 154 of FIG. 1. Each server 304A to 304B may have one or more instances of a virtual server running on that physical server and multiple virtual instances may be implemented by the design. A firewall may be established between a client computing system, for example, 302D and the network 320 to protect data integrity on the client computing system 302D. Processing circuitry on any one or more of servers 304A-304B may perform the functions described above in relation to FIGS. 1-3, e.g., encoder and decoder functions of autoencoder 15, training of machine learning systems, applying loss functions or other operations described herein.

A cloud provider service can install and operate application software in the cloud and users can access the software service from the client devices. For example, a user may select and apply one or more decoders from decoder library 154 or apply settings to one or more loss functions. Cloud users who have a site in the cloud may not solely manage the cloud infrastructure and platform where the application runs. Thus, the servers and databases may be shared hardware where the user is given a certain amount of dedicated use of these resources. The user's cloud-based site is given a virtual amount of dedicated space and bandwidth in the cloud.

Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device, 302A-302G, as well as a web-browser application resident on the client device, 302A-302G. In some situations, the cloud-based remote access for a wearable electronic device 302C, can be accessed via a mobile device, a desktop, a tablet device, cooperating with that wearable electronic device 302C. The cloud-based remote access between a client device 302A 302G and the cloud-based provider site 304A is coded to engage in one or more of the following 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud based remote access to a wearable electronic device, and 5) combinations of these.

In an embodiment, the server computing system 304A may include a server engine, a web page management component or online service or online app component, a content management component, and a database management component. The server engine performs basic processing and operating system level tasks. The web page management component, online service, or online app component may handle creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

Figure 5:
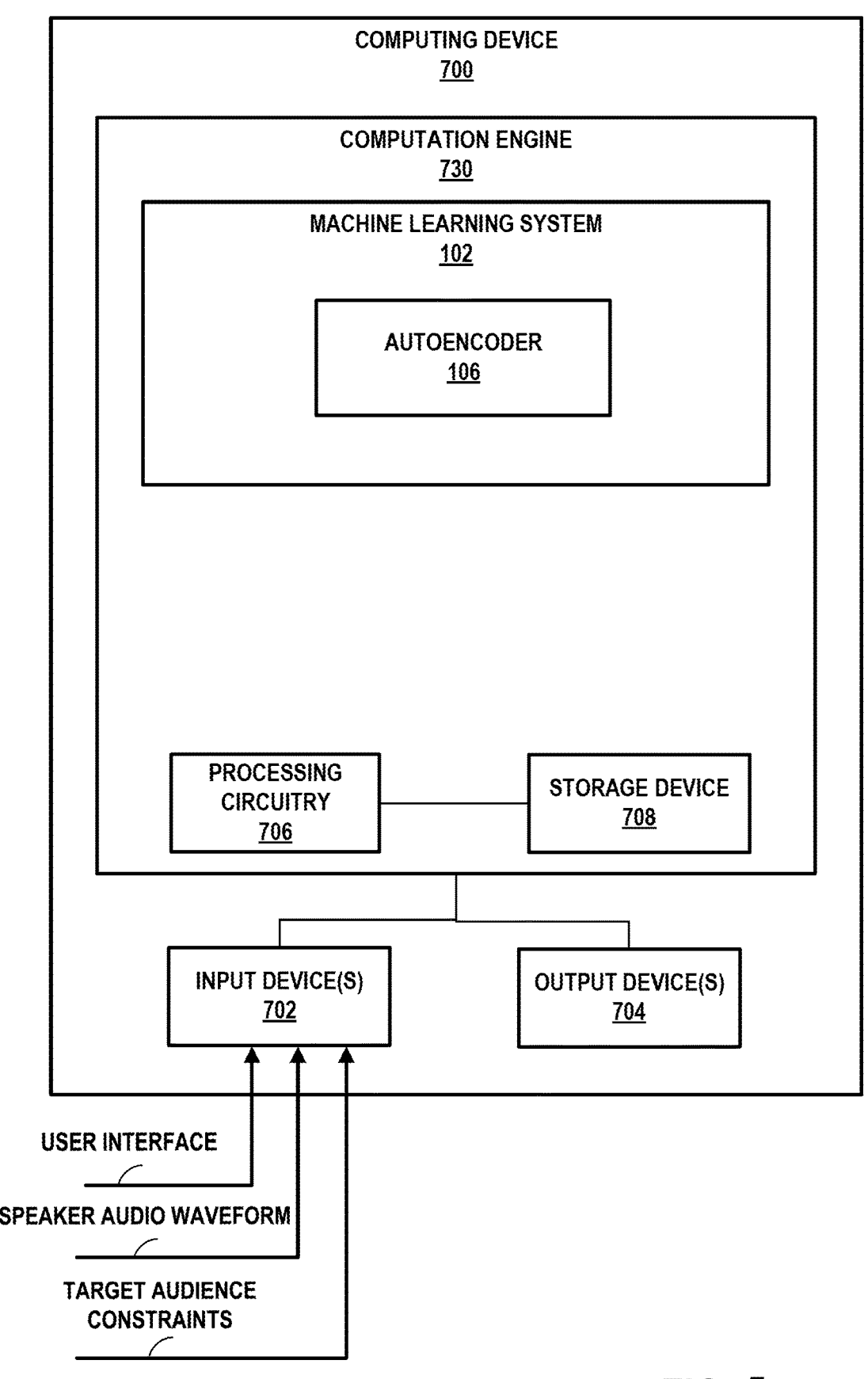
FIG. 5 is a block diagram illustrating a computing device operating in training mode to implement an autoencoder configured to output a modified audio waveform according to one or more techniques of this disclosure.

FIG. 5 is a block diagram illustrating a computing device 700 operating in training mode to implement an autoencoder configured to output a modified audio waveform according to one or more techniques of this disclosure. In the example of FIG. 5, computing device 700 includes computation engine 730, and one or more input devices 702. In the example of FIG. 5, the functions of computing device 700 may operate on a single computing device, e.g., a computing device with one or more processors. In other examples, the functions of computing device 700 may be distributed in a network environment, as described above in relation to FIG. 4.

In the example of FIG. 5, a user of computing device 700 may provide input including an audio waveform of a speaker, target accent constraints and inputs from a user interface adjusting the weights for text loss vs ID loss, as described above. Some examples of target accent constraints may include the target audience language, the region for audience (e.g., English from New York City, Liverpool England or Ozark Alabama), the venue (e.g., teleconference, lecture, large or small meeting), subject matter to be discussed, and similar constraints. Input devices 702 may include a keyboard, pointing device, voice responsive system, video camera, biometric detection/response system, button, sensor, mobile device, control pad, microphone, presence-sensitive screen, network, or any other type of device for detecting input from a human or machine.

Computation engine 730 may process the constraints, such as constraints that characterize an accent for a target audience, as well as process weight adjustments and the input audio waveform with machine learning system 102. In some examples, a constraint may be considered a label for a specified accent, e.g., for a group of people who speak in a particular way. In other examples, a constraint may include some characterization of a way of speaking.

In some examples the speaker audio waveform may also include metadata describing the speaker's accent, type of language, language rhythm, intonation, and other characteristics. Machine learning system 102 may represent software executable by processing circuitry 706 and stored on storage device 708, or a combination of hardware and software. Such processing circuitry 706 may include any one or more of a microprocessor, a controller, a digital signal processor (DSP), an application specific integrated circuit (ASIC), a field-programmable gate array (FPGA), or equivalent discrete or integrated logic circuitry. Storage device 708 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 700, such as processing circuitry 706 and/or storage device 708, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

Machine learning system 102 may implement autoencoder 106, which is an example of the autoencoders described above in relation to FIGS. 1-3 and may perform the same or similar functions and include the same or similar characteristics. In other words, machine learning system 102, while in training mode, may train each respective decoder with a combination of intelligibility loss and speaker identification loss for a specific speaker and a specific target accent. The trained decoder of autoencoder 106 may be configured to maintain intelligibility for the target audience without sacrificing the personality of the speaker, e.g., without sacrificing individuality of the utterances by the speaker. Said another way, the machine learning system may generate the output waveform to retain recognizable individual language characteristics of the speaker but adjust the speech for the target accent.

As described above in relation to FIG. 2, in some examples, machine learning system 102 may implement a GAN, while in other examples other types of neural networks may be used. For example, the techniques of the disclosure may make use of a single neural network (e.g., that does not undergo optimization through competition with a second neural network). In further examples, machine learning system 102 may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train one or more models for generating the enhanced speech output.

Figure 6:
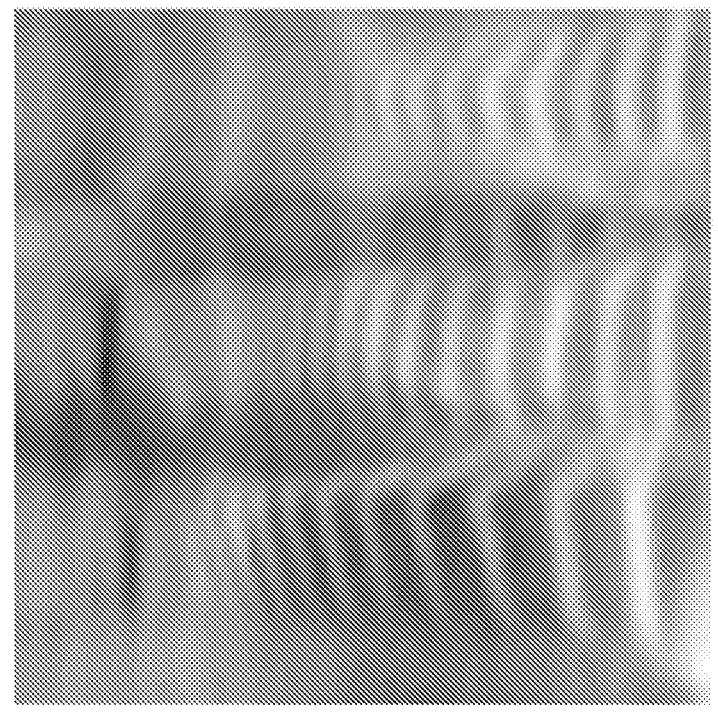
FIG. 6 depicts example speech spectrograms.
Figure 6:
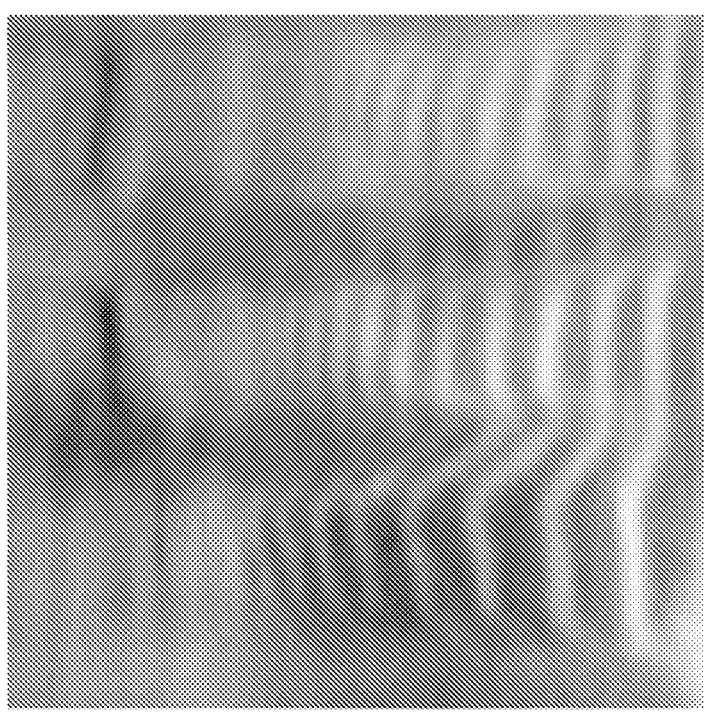

FIG. 6 depicts example speech spectrograms. For example, the figure may depict an example of an individual with a Japanese accent after conversion to an American accent.

Figure 7:
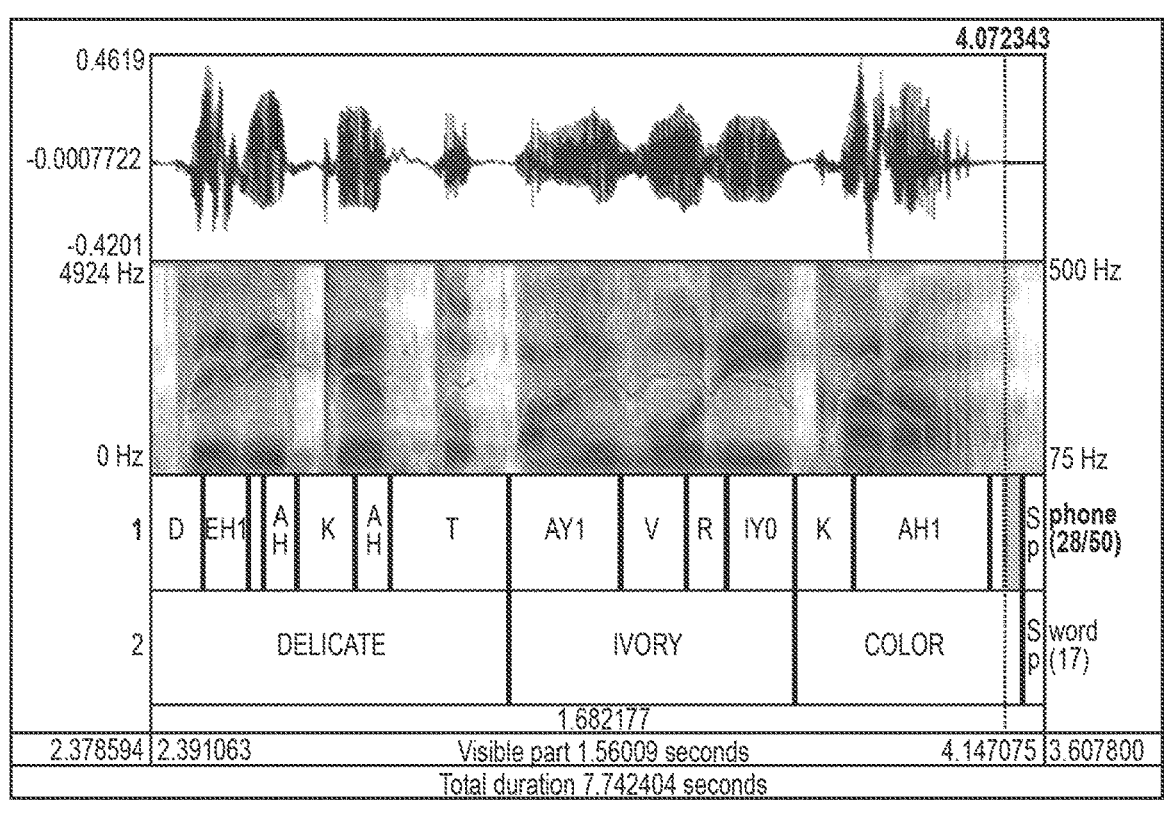
FIG. 7 are diagrams depicting example speech waveforms and analysis for multiple words spoken by differently accented individuals, according to one or more techniques of this disclosure.
Figure 7:
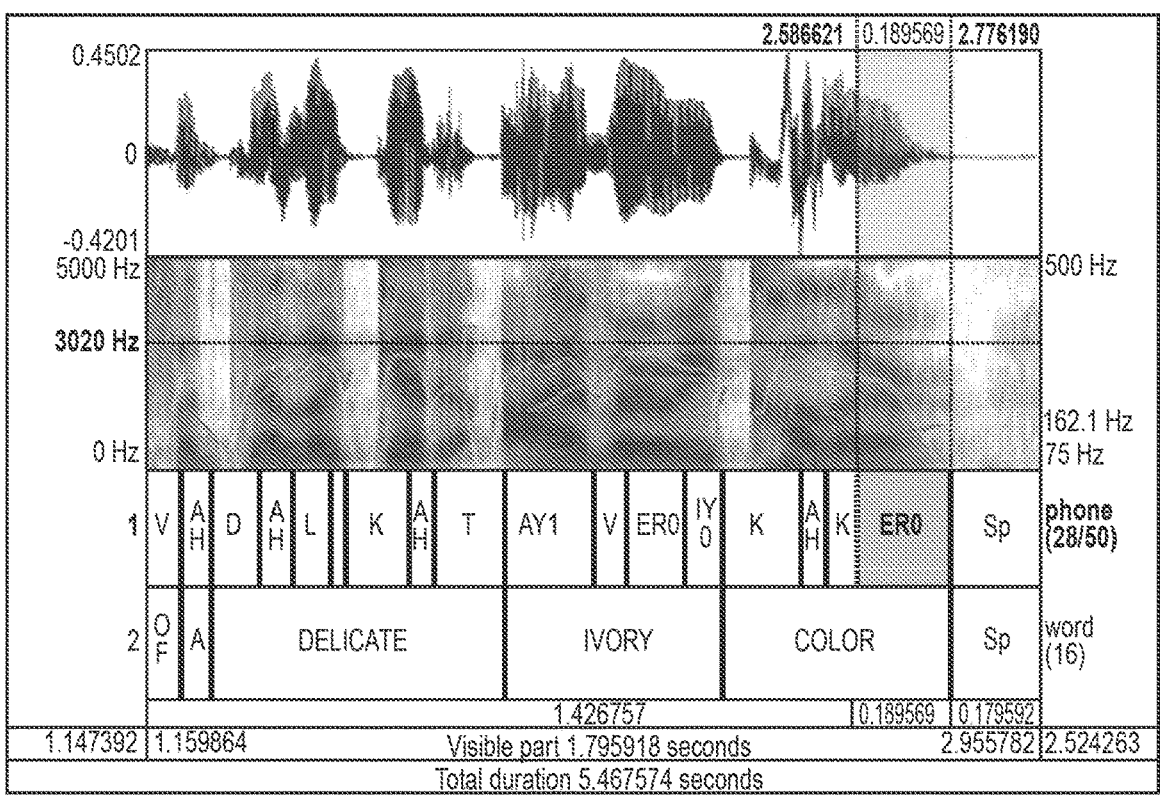

FIG. 7 are diagrams depicting example speech waveforms and analysis for multiple words spoken by differently accented individuals, according to one or more techniques of this disclosure. For example, the figure depicts three English words as spoken by an individual whose native language is Japanese, and therefore may speak English with a Japanese accent.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

In summary, the disclosure describes a system that receives as input an audio waveform representing speech from an individual and produces as output a modified version of the audio waveform that maintains all of the speaker's speech characteristics (timbre) as well as prosody for specific utterances (e.g., voice timbre, intonation, timing, intensity). The system uses a bottleneck-based autoencoder with speech spectrograms as input and output. To produce the output audio waveform, the system includes a reconstruction error-based loss function with two additional loss functions. The second loss function is speaker "real vs fake" discriminator that penalizes for the output not sounding like the speaker, e.g., a penalty for misidentifying the speaker. The third loss function is a speech intelligibility scorer that penalizes the output for speech that is difficult for the target population to understand. In some examples, the bottleneck-based autoencoder may be similar to an autoencoder used to process images. The techniques of this disclosure may also be further described by the following examples.

In one or more examples, the functions described above may be implemented in hardware, software, firmware, or any combination thereof. For example, the various components of FIGS. 1-5, such as autoencoder 15, converter 12, processing circuitry 706 and similar components may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein, such as processing circuitry 806 of FIG. 4B, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A system comprising:
an input device configured to receive an input audio waveform comprising utterances by a speaker; and
a computation engine comprising processing circuitry for executing a machine learning system,
wherein the machine learning system is configured to implement an autoencoder, the autoencoder comprising a decoder trained to characterize an accent for a target accent, the decoder configured to modify the utterances by the speaker based on the target accent and a differential weighting between a speaker identification (ID) loss function that applies a penalty based on an identity for the speaker and a text loss function that applies a penalty for loss of intelligibility,
wherein the machine learning system is configured to process the input audio waveform to generate an output audio waveform that includes the modified utterances, and
wherein the machine learning system is configured to output the output audio waveform.

2. The system of claim 1,
wherein the autoencoder is configured to encode the input audio waveform based at least in part on derived features of the utterances by the speaker, and
wherein the derived features comprise one or more of pitch, emphasis, phonemes, energy or pauses.

3. The system of claim 1,
wherein the machine learning system is configured to receive a user input, and
wherein the machine learning system is configured to, in response to the user input, adjust the differential weighting between the text loss function and the speaker identification loss function.

4. The system of claim 3,
wherein the target accent is a first target accent, and the output audio waveform is a first output audio waveform,
wherein the decoder is further trained using constraints for a second target accent, wherein the constraints for the second target accent are different from the constraints for the first target accent, and
wherein, in response to user input, the machine learning system is configured to output a second output audio waveform different from the first output audio waveform based on the constraints for the second target accent.

5. The system of claim 1, wherein the machine learning system is configured to generate the output audio waveform to adjust intelligibility of utterances by the speaker based on the target accent and retain recognizable individual language characteristics of the speaker.

6. The system of claim 5,
wherein the machine learning system is configured to generate the output audio waveform to retain recognizable individual language characteristics of the speaker, and
wherein the speaker ID loss function is configured to apply the penalty for misidentifying the speaker.

7. The system of claim 1,
wherein to conform to the target accent, the machine learning system is configured to generate the output audio waveform to disguise recognizable individual language characteristics of the speaker, and
wherein the speaker ID loss function is configured to apply the penalty for correctly identifying the speaker.

8. The system of claim 1,
wherein the processing circuitry further executes a converter, and
wherein the converter is configured to receive the input audio waveform and provide an output to the autoencoder, the output comprising a spectrogram.

9. The system of claim 1, wherein the autoencoder comprises a neural network.

10. The system of claim 1, wherein the autoencoder is configured to encode and decode the input audio waveform at least in part at a phoneme trigram level.

11. The system of claim 1, wherein the decoder is further configured to modify the utterances by the speaker based on a signal loss function.

12. The system of claim 1,
wherein at least one of the speaker ID loss function or the text loss function is a separate, pre-trained loss function, and
wherein the decoder is trained based on the at least one separate, pre-trained loss function.

13. The system of claim 1, wherein the autoencoder is trained along with the speaker ID loss function or the text loss function as an adversarial network.

14. The system of claim 1, wherein the decoder is a first decoder of a plurality of decoders stored at a decoder library operatively coupled to the machine learning system.

15. The system of claim 14, wherein the computation engine is configured to:
receive user input indicating a desired accent,
select a decoder of the plurality of decoders that characterizes the desired accent, and
apply the selected decoder to generate the output audio waveform.

16. A method comprising:
processing, with an encoder of a machine learning system, an input audio waveform comprising first utterances by a speaker to generate an encoder output, the first utterances having a first accent;
processing, with a decoder of the machine learning system, the encoder output to generate an output audio waveform comprising second utterances, the second utterances having a second accent different from the first accent;
computing, with an identification loss discriminator of the machine learning system, based on the input audio waveform and the output audio waveform, an identification loss for the output audio waveform;
computing, with a text loss discriminator of the machine learning system, based on the input audio waveform and the output audio waveform, a text loss for the output audio waveform; and
training the decoder using the identification loss and the text loss, wherein the trained decoder is configured to modify speaker utterances based on a target accent and a differential weighting between a speaker identification loss function that applies a penalty based on a speaker identity and a text loss function that applies a penalty for loss of intelligibility.

17. The method of claim 16, further comprising encoding, by the machine learning system the input audio waveform based at least in part on derived features of the first utterances by the speaker, wherein the derived features comprise one or more of: pitch, emphasis, phonemes and pauses.

18. The method of claim 17, wherein the decoder is a first decoder of a plurality of decoders stored at a decoder library operatively coupled to the machine learning system, the method further comprising, selecting, by the machine learning system, a second decoder from the decoder library based on input from a user.

19. A non-transitory computer-readable storage medium comprising instructions that, when executed, cause one or more processors of a computing device to:
  receive an input audio waveform comprising utterances by a speaker; and
  execute a machine learning system,
    wherein the machine learning system is configured to implement an autoencoder, the autoencoder comprising a decoder trained to characterize an accent for a target accent, the decoder configured to modify the utterances by the speaker based on the target accent and a differential weighting between a speaker identification (ID) loss function that applies a penalty based on an identity for the speaker and a text loss function that applies a penalty for loss of intelligibility,
  wherein the machine learning system is configured to process the input audio waveform to generate an output audio waveform that includes the modified utterances, and
  wherein the machine learning system is configured to output the output audio waveform.

20. The non-transitory computer-readable storage medium of claim 19, further comprising instructions for causing the one or more processors to generate the output audio waveform to:
  adjust intelligibility of utterances by the speaker based on the target accent; and
  retain recognizable individual language characteristics of the speaker.

* * * * *